Nov. 6, 1956

H. A. BIRKNESS ET AL 2,769,459

MULTIPLE SELECTOR VALVE

Filed March 2, 1953

INVENTORS:
Harald A. Birkness
John P. Segers

BY Everett A. Johnson

ATTORNEY

Nov. 6, 1956 — H. A. BIRKNESS ET AL — 2,769,459
MULTIPLE SELECTOR VALVE
Filed March 2, 1953

INVENTORS:
Harald A. Birkness
John P. Segers
BY Everett A. Johnson
ATTORNEY

2,769,459
MULTIPLE SELECTOR VALVE

Harald A. Birkness, Homewood, and John P. Segers, Riverdale, Ill., assignors to Standard Oil Company, Chicago, Ill., a corporation of Indiana Application March 2, 1953, Serial No. 339,647

3 Claims. (Cl. 137—607)

This invention relates to valve structures and more particularly to an improved valve structure designed for selectively connecting one of a number of fluid supply conduits with a single outlet.

Heretofore, selector valves have been proposed, but they are based on unsatisfactory designs which are subject to close machining tolerances, to excessive wear, and to leakage. Another difficulty with multiple selector valves heretofore proposed is that there is a large liquid holdup within the valve mechanism which does result in contamination when the flow of fluids is changed from one conduit to another.

It is, therefore, a primary object of our invention to provide an improved valve structure for connecting a plurality of fluid sources operating with a common outlet. Another object of the invention is to provide a valve structure which has a minimum holdup of liquid when switching from one conduit to another. It is a further object of our invention to provide an improved valve assembly which may be constructed as a unit and which may be easily added or replaced in a fluid circuit. Another object is generally to simplify the construction of a valve of this type to provide a compact, light weight, and relatively small mechanism without sacrificing efficiency and accuracy of operation. An additional object of the invention is to provide a simple and rugged valve structure which is not subject to external leakage. More specifically, it is an object to provide a valve structure which can be altered or expanded to include additional inlet ports as desired. These and other objects of our invention will become apparent as our description thereof proceeds.

Briefly, our invention comprises a flat valve body, a plurality of inlet valves arranged radially of a central operating cam. Each valve plug comprises a valve rod about which is threaded a resilient O-ring. A spring holds the valve in a closed position and is of sufficient strength to preclude any bleeding from one inlet line to another. When opened, liquid flows past a valve seat, thence through a connecting bore to an annular distributing groove cut into the valve body adjacent to a back plate. From the annular groove or passageway the fluid flows through an outlet fitting located at the periphery of the valve body. External leakage from the annular distributing groove is prevented by an O-ring gasket between the valve body and the back plate, and a second O-ring packing is provided between the cam shaft and the bore in the housing.

Operation of the valve is by means of a lever which is fixed so as to turn with the cam shaft. Turning the handle rotates the cam thereby actuating a particular valve guide rod which compresses the spring and raises the resilient valve from the seat permitting the flow of fluids into the annular channel as described.

Additional advantages of our invention will become apparent from the following detailed description taken in connection with the accompanying drawings in which.

Figure 1:
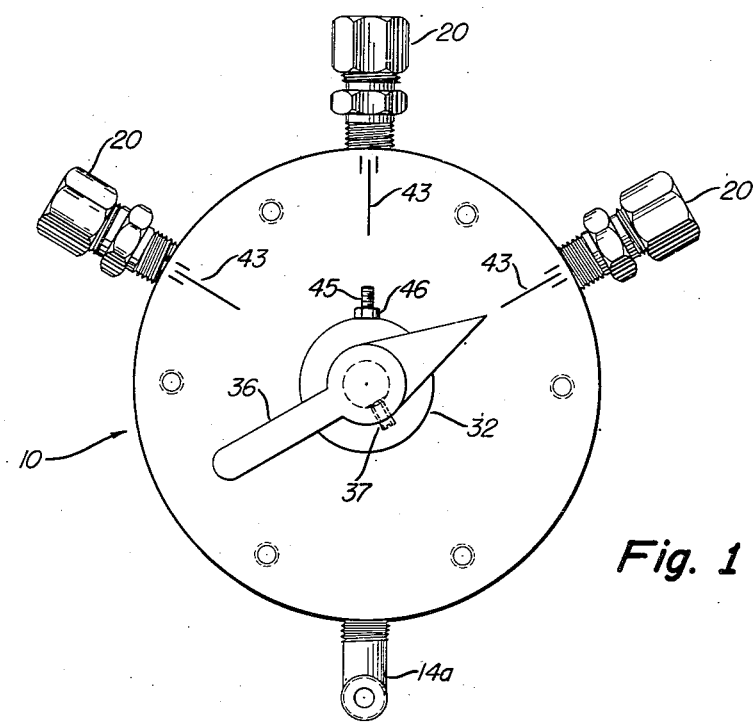
Figure 1 is a plan view of the valve casing showing the array of inlets and outlet.
Figures 6, 7:
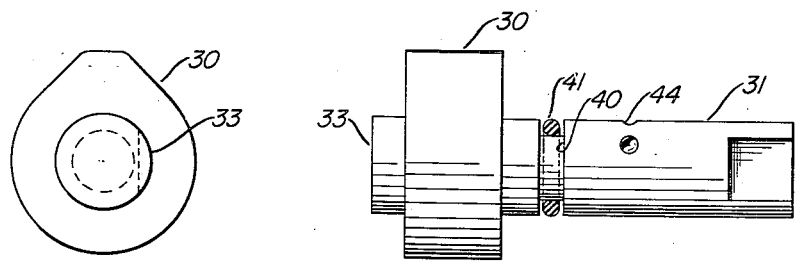
Figures 6 and 7 are end and side views, respectively, of the cam and cam operating shaft.
Figures 8, 9:
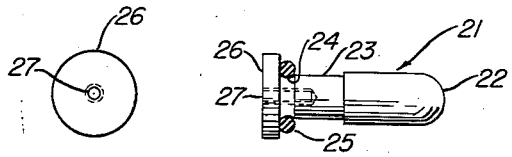
Figures 8 and 9 are end and side views, respectively, of the valve plug.

Referring to the drawings, the valve body 10 is provided with a plurality of radially extending valve chambers 11. Each chamber 11 may be brought into communication with an annular distributing channel 12 formed in the valve body 10. The annular channel 12 is in fluid communication with each of the radial valve chambers 11 by the axial ducts 13 and in communication with the outlet 14 by the branch channel 15. Each valve chamber 11 comprises a first radial bore 17 and a second larger radial bore 18 in alignment with the said bore 17. This provides a shoulder which comprises valve seat 16. The outer or peripheral end of the bore 18 is provided with threads 19 for engaging the fittings 20 which in turn are connected to the respective inlet conduits (not shown). Within each valve chamber 11 is a poppet valve assembly 21. Each assembly includes a valve rod or stem 22 having a reduced section 23 to permit flow around the stem and an annular groove 24 which groove accommodates a resilient gasket or O-ring 25. The end plate or valve head 26 is provided with a threaded axial bore 27 to facilitate the withdrawal of the valve assembly 21 from the valve chamber 11.

Figure 3:
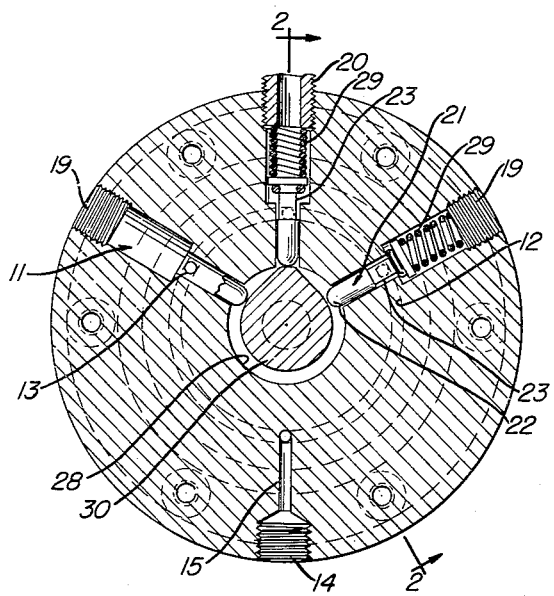
Figure 3 is a section taken substantially along the line 3—3 in Figure 2.
Figure 2:
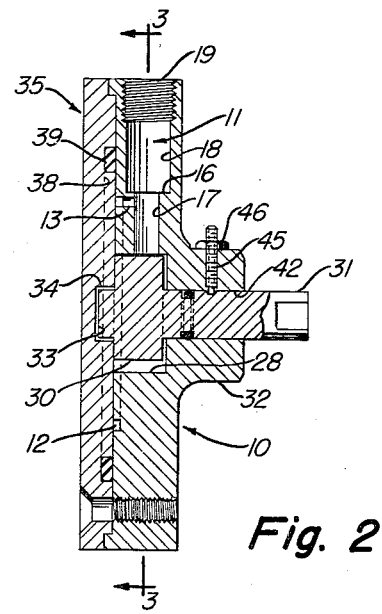
Figure 2 is a section taken substantially along the line 2—2 in Figure 3.
Figure 4:
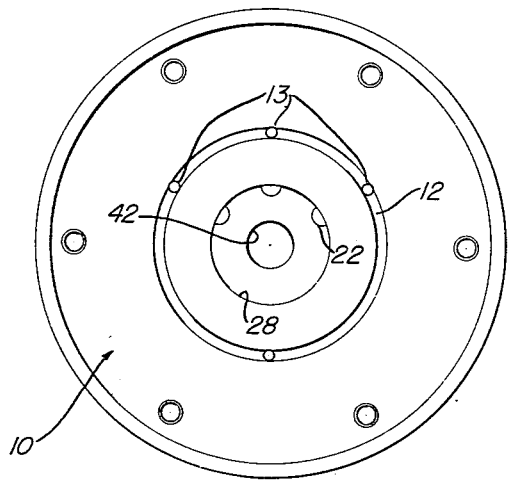
Figure 4 is a view of the main housing with the backing plate removed.
Figure 5:
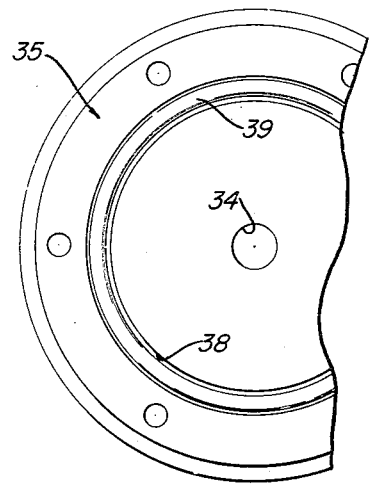
Figure 5 is a fragmentary plan view of the backing plate.

A central cam chamber 28 comprises a recess in the valve body 10 and is connected with the bores 17 within which the valve guide rod 22 extends as shown in Figure 3. A compression spring 29 abuts the valve head 26 and the end of a fitting 20 threaded into the larger bore 18. The cam 30 is integral with a cam shaft 31 extending axially of the body 10 through a hub 32. The enclosed end of the cam shaft assembly 31 comprises a terminal projection 33 which is rotatably held in alignment by the seat 34 comprising a recess in the backing plate 35. An indicating handle 36 is keyed by means of set screw 37 to the exterior end of the cam shaft 31.

The backing plate 35 is provided with an annular groove 38 to accommodate an O-ring 39 which prevents external leakage at the periphery of the valve body 10. On the cam shaft 31 is an annular groove 40 accommodating a second O-ring 41 which seals against leakage through the bore 42 in the hub 32 within which the cam shaft 31 is rotated.

The face of the body 10 is provided with index means 43, each designating a separate inlet line. For the purpose of locking the valve-actuating cam 30, we provide detents 44 on the cam shaft 31 for each valve-opening position of the cam 30, and a threaded spring pin assembly 45 passing through the hub 32 and locked in place by nut 46.

From Figure 3 it will be apparent that additional inlet bores and valve assemblies can be added to the valve body 10 as the need arises. Likewise, the cam 30 may be divided so as to provide two cam lifting surfaces which will open two valves simultaneously if it should be desired to blend materials from selected inlet lines.

Our valve was designed for use on rapidly flowing small streams of gasoline directed to a device for determining Reid Vapor Pressure. In the operation of such devices it frequently becomes desirable to interchange quickly the flow from one of several streams. It is further very desirable that liquid holdup be small and that the valve be operable without the necessity of a lubricant which would contaminate the streams being controlled. Further, there must be no mixing of the streams and accordingly, we have provided positive seating and avoided the possibility of erroneous vapor pressure readings by inadvertent mixing in the selector valve operation. It should be understood, however, that the principles involved in our design can be applied to other uses and other types of flow control and those skilled in the art will recognize that the overall dimensions may be changed to suit specific installations.

In the drawings we have illustrated a valve which is 3⅝ inches in overall diameter and about ¾ inch thick with a central hub about 1 inch in diameter and ½ inch long. The inlet and outlet lines accommodate standard ⅛ inch pipe fittings. Such an assembly is readily mounted in even limited space within instrument cabinets and can be easily flush mounted.

A particular advantage of our valve design is the simplicity of the manufacturing operations, only a lathe and drill press being necessary for its fabrication. Accordingly, it is possible to employ materials of construction which normally are not used in valves because of the difficulty of machining such materials. For example, our valve can be made of stainless steel and employ Teflon O-rings thereby making it substantially resistant to corrosive fluids. A further advantage is that inlet ports can be arranged at any angular position desired. Likewise, the resilient gasket or O-ring on the valve stem may be readily replaced if necessary. This operation involves removing the fitting 20 and inserting a threaded rod into the threaded bore 27 in the head 26 of the valve assembly. This permits the axial withdrawal of the assembly.

From the above it will be apparent that modifications can be made in the invention without departing from the spirit thereof as described with reference to a specific embodiment, such description and embodiment being for the purpose of illustration only.

What we claim is:

1. A multiple selector valve comprising a valve body of the disc type, a central hub on one face of said body, a central recess in said body below said hub, an axial bore through said hub communicating with said recess, a plurality of radially extending bores radiating from said central recess, a shoulder in each of said bores intermediate the ends thereof, a valve seat on each of said shoulders, a fluid distribution channel on the rear face of the valve body concentric with said central recess and communicating with all of said radial bores, an outlet channel means in said body communicating with said distribution channel, a backing plate for said valve body enclosing said annular channel and said central recess, gasket means between said backing plate and said valve body arranged concentrically with and radially beyond said distribution channel, a valve plug in each of said radial bores comprising a valve rod extending radially inward of said valve seat and into said central recess, a valve ring on said valve rod adjacent one end thereof and adapted to be seated on said valve seat, a flanged head on said valve rod on the outer end thereof adjacent said valve ring, a compression spring means acting on said head normally to retain said valve ring in contact with said valve seat, a cam means operating within said central recess, and a cam shaft means for rotating said cam to radially extend said valve rod whereby said valve ring is lifted from said valve seat against the action of said spring.

2. A selector valve structure comprising a disc-like valve body, a plurality of radially extending valve chambers in said body, each of said chambers comprising an innermost bore and an outer bore of greater diameter than said innermost bore, both of said bores being in radial alignment, thread engaging means at the outer end of said outer bore adjacent the periphery of said valve body, a centrally located recess in said valve body, an annular distribution channel means concentric to said central recess, an outlet channel means communicating with said annular distribution channel, a valve assembly in each of said radially disposed chambers, each of said assemblies comprising a valve stem, a valve shank of reduced diameter, a valve closure consisting of a resilient ring about said shank, and an enlarged head portion for retaining said resilient ring on said shank, a compression spring within said outer bore adapted to urge said valve radially within said bores and to hold said ring in contact with the valve seat provided by a shoulder at the inlet of said inner bore, a cam means within said recess for selectively and individually contacting the valve guide stem which normally extends through said inner bore into said central recess, a backing plate for said valve body, an annular groove in said backing plate, a sealing ring in said groove for preventing leakage between said backing plate and said valve body, a seat centrally located in said backing plate adapted to receive one end of the cam shaft, a hub on the face of said valve body, an axial bore in said hub through which the said cam shaft extends, threaded means for retaining said backing plate on said valve body, a series of detents on said cam shaft, spring pin means for engaging one of said detents at a time and for locking said cam shaft and cam in a selected position, and sealing ring means on said cam shaft sealing against leakage between said cam shaft and the bore of said hub.

3. The multiple selector valve of claim 2 wherein said distribution channel is disposed in a plane spaced from a plane including the axes of said radial bores, and wherein said cam means occupies a substantial volume of the said central recess thereby to reduce liquid holdup in the valve body.

References Cited in the file of this patent

UNITED STATES PATENTS

| 538,299 | Tower | Apr. 30, 1895 |
| 771,473 | Hooper | Oct. 4, 1904 |
| 1,160,484 | Wright | Nov. 16, 1915 |
| 1,231,164 | Jahns | June 26, 1917 |
| 1,635,259 | Critchley | July 12, 1927 |
| 2,341,330 | Parker | Feb. 8, 1944 |
| 2,544,597 | Itri | Mar. 6, 1951 |
| 2,556,668 | Williams | June 12, 1951 |
| 2,580,553 | King | Jan. 1, 1952 |
| 2,614,851 | Parker | Oct. 21, 1952 |

FOREIGN PATENTS

| 27,953 | Australia | of 1930 |